United States Patent [19]

Corona

[11] Patent Number: 5,917,535
[45] Date of Patent: Jun. 29, 1999

[54] DIGITAL LED PRINTER WITH IMPROVED DATA FLOW AND CONTROL

[75] Inventor: Stephen C. Corona, Webster, N.Y.

[73] Assignee: Xerox Corporation, Stamford, Conn.

[21] Appl. No.: 08/674,065

[22] Filed: Jul. 1, 1996

Related U.S. Application Data

[63] Continuation-in-part of application No. 08/181,547, Jan. 14, 1994.

[51] Int. Cl.[6] .................................. B41J 2/47; B41J 2/435
[52] U.S. Cl. ............................................ 347/238; 347/240
[58] Field of Search .................................... 347/238, 240, 347/237, 130, 132

[56] References Cited

U.S. PATENT DOCUMENTS

| | | | |
|---|---|---|---|
| 4,525,729 | 6/1985 | Aguire et al. | 347/237 |
| 4,626,923 | 12/1986 | Yoshida | 347/237 |
| 4,689,694 | 8/1987 | Yoshida | 358/298 |
| 4,706,130 | 11/1987 | Yamakawa | 358/296 |
| 4,998,119 | 3/1991 | Collins et al. | 347/237 |
| 5,025,322 | 6/1991 | Ng | 358/298 |
| 5,111,217 | 5/1992 | Zeise | 347/232 |
| 5,126,759 | 6/1992 | Small et al. | 347/237 |
| 5,138,337 | 8/1992 | Ng | 347/237 |
| 5,253,934 | 10/1993 | Potucek et al. | 347/237 |
| 5,315,320 | 5/1994 | Murano | 347/180 |
| 5,327,524 | 7/1994 | Ng | 395/108 |
| 5,604,527 | 2/1997 | Ng et al. | 347/240 |

*Primary Examiner*—N. Le
*Assistant Examiner*—Thinh Nguyen
*Attorney, Agent, or Firm*—John M. Kelly

[57] ABSTRACT

A digital LED printer having a printbar control architecture that enables multi-exposure levels and multiple gray levels for a LED printbar. A light emitting diode printbar is aligned in an image exposure relationship with a photoreceptor. Video data signal comprised of multiple bits for each pixel are applied to a register/latch. The individual bits of the latched multiple bits for a pixel are applied to AND gates. Those signals are ANDed with multiple strobe line signals that are related to the status of the printer. The outputs of the AND operation are applied to an OR gate. The output of the OR gate is used to control the illumination from a light emitting diode. Beneficially, the characteristics of the light emitting diode are measured and stored such that the current applied to the light emitting diode can be adjusted such that the illumination from the light emitting diode is at a predetermined value.

11 Claims, 5 Drawing Sheets

DIGITAL LED PRINTER WITH IMPROVED DATA FLOW AND CONTROL

This is a continuation-in-part of U.S. patent application Ser. No. 08/181,547, which was filed on Jan. 14, 1994.

This invention relates to control electronics for digital printbars with multiple illumination levels and multi-level exposures.

BACKGROUND OF THE INVENTION

Image printbars which are used in image recording systems are well known in the art. Such printbars are generally comprised of a linear array of a plurality of discrete, light-emitting sources. Examples of such printbars include wire dot, electrostatic, ink jet, thermal printheads, and light emitting diodes. Because of their high resolution at reasonable cost, light emitting diodes (LED) printbars are frequently used.

In a typical light emitting diode printbar a large number of individual light emitting diodes are arranged in an elongated, planar array that is placed adjacent an image recording member. By providing relative motion between the light emitting diode printbar and the image recording member, the light emitting diode printbar scans the image recording member. By selectively illuminating the individual light emitting diodes and the image recording member is scanned a desired latent image can be recorded on the image recording member.

The selective illumination of the individual light emitting diodes is performed according to image-defining video data information which is applied to LED driver circuitry. Conventionally, the image-defining video data information took the form of simple binary video data signals. Those data signals might be from any of a number of data sources, such as a Raster Input Scanner (RIS), a computer, a word processor, or a facsimile machine. Typically, the binary video data was clocked into a shift register. After completely shifting the data into the shift register, the contents of the shift register was transferred in parallel into latch circuits for temporarily storage. Then, upon the occurrence of a start of line signal, the latched data was applied to LED drive circuits which illuminated the individual light emitting diodes of the light emitting diode printbar so as to produce a line of the latent image. A complete latent image was formed by performing successive line exposures until the complete late image was produced. U.S. Pat. Nos. 4,689,694; 4,706,130; 5,138,337 and 5,126,759 are representative of prior art printbar control circuitry. Prior art exposure control systems are disclosed in U.S. Pat. Nos. 4,525,729, 5,025,322 and in co-pending U.S. patent application Ser. No. 07/898,604 filed on Jun. 15, 1992. The contents of these prior art references are hereby incorporated by reference.

Prior art light emitting diode drive control-systems generally have limited individual light emitting diode drive control. The ability to specifically tailor the drive of each light emitting diode so as to optimize pixel-to-pixel uniformity, to enable multiple exposure levels (gray level exposures), or to accurately compensate for the electrical drive to optical output power differences between the individual light emitting diodes is adversely impacted by the architecture of the light emitting diode printbar drive control system. Therefore, an improved light emitting diode printbar drive control system would be beneficial.

SUMMARY OF THE PRESENT INVENTION

This invention provides for a light emitting diode printbar drive control architecture that utilizes multibit per pixel video data and multiple strobe signals to provide for enhanced "gray" multi-level exposure of a charged photoreceptor. The printbar drive control architecture drives the individual light emitting diodes of the light emitting diode printbar based upon the contents of the multibit video data, which contains the image information, and upon the strobe signals, which contain printer related information, such as timing and exposure levels. Blending the multibit video data with the strobe signals is beneficially achieved pixel by pixel using logical AND gates whose output are applied to a logical OR gate. The output of the OR gate controls the illumination period of a light emitting diode, and thus the exposure of the photoreceptor. Beneficially, the current drive for each light emitting diode is controlled to correct for light emitting diode to light emitting diode uniformity variations such that each light emitting diode, when ON, exposes the photoreceptor such that uniform dots are produced from the same drive conditions.

DESCRIPTION OF THE INVENTION

The principles of the light emitting diode printbar control architecture disclosed in the present invention can be used in a variety of applications which use light emitting diode printbars to expose a photosensitive surface. While the following describes a printbar control architecture that controls the exposure of a charged photoreceptor, the principles of the present invention extend well beyond the specific embodiment that is subsequently disclosed. For example, the principles of the present invention are also suitable for controlling the exposure of a photosensitive film. Therefore, it is to be understood that the present invention is to be limited only by the claims, not limited by the specific embodiment that is subsequently described.

Figure 1:
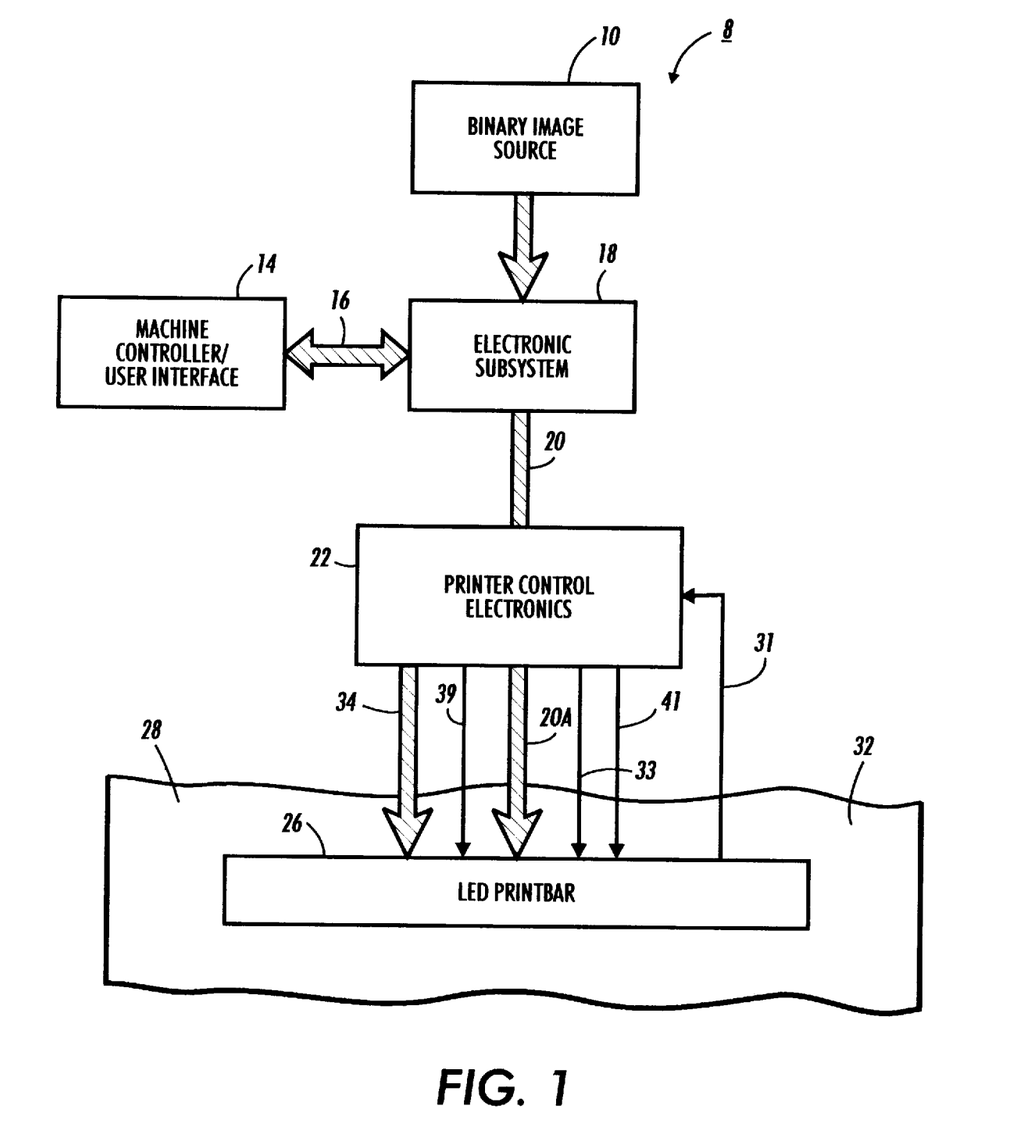
FIG. 1 is a block diagram showing the major components of an electrophotographic printer that uses a light emitting diode printbar and which is in accord with the principles of the present invention.

FIG. 1 shows, in block diagram form, a print engine data flow architecture 8 that is suitable for incorporating the principles of an inventive light emitting diode printbar control architecture. The print engine data flow architecture 8 includes a digital image source 10. That source, which might physically be any of a number of different devices, including a memory storage unit, a computer, a scanner, or a facsimile machine, produces a set of digital image data. In more primitive print engine data flow architectures that digital image data would have represented the data set which controlled the exposure of a photoreceptor by a light emitting diode printbar. However, the print engine data flow architecture 8 is specifically designed to modify the digital image data so as to enhanced the exposure of the photoreceptor.

Modifying a digital image data set so as to enhance the exposure of a photoreceptor is well known in the prior art. Such prior art exposure enhancements include those directed to image half-toning, edge enhancement, contrast enhancement, dithering, sub-scan line corrections and adjustments, manual adjustments to the image, highlighting, and color correction. Such prior art exposure enhancements (which are often referred to as image enhancements) are well documented. However, it is to be understood that the principles of the present invention are not directed to specific exposure enhancements, but rather to a printbar control architecture by which such exposure enhancements of a digital data set are used to expose a photoreceptor (or other light sensitive element).

Still referring to FIG. 1, the digital image data from the digital image source 10 is applied to an electronic subsystem 18. A machine controller/user interface 14 synchronizes all machine activity, including that of the electronic subsystem. The machine controller/user interface represents a system by which a machine operator initiates changes to the digital image data. For example, the machine controller/user interface 14 might provide for a visual representation of the digital image data whereby a machine operator might induce a color shift in the digital image. In another system the machine controller/user interface might provide for contrast enhancement, dithering, and/or image area highlighting. In any event, the machine controller/user interface outputs correction signals on a bus 16 to the electronic subsystem 18. Those correction signals represent operator induced commands that are to be made to the digital image data.

The purpose of the electronic subsystem 18 is to provide for image enhancement and to reformat the digital image data into multibit video information in a form compatible with a light emitting diode printbar. Such conversion will typically include operating on the digital image data according to the operator correction signals and/or according to various image processing techniques so as to achieve an enhanced image. Typical image processing techniques include edge enhancements and sub-line image corrections. The result of reformatting, operator induced corrections to the image, and the image processing techniques is multibit video information wherein each pixel to be imaged on a photoreceptor is represented by N bits of information. For convenience, it is assumed that N is 4 bits in the following discussion. As is well known, N bits can be used to represent $2^N$ levels of brightness. Such representation is commonly referred to as gray scale. Referring now to FIG. 1, the electronic subsystem outputs the multibit video information on a bus 20 which sends that information to printbar control electronics 22.

In addition to producing other signals the print bar control electronics produces multiple strobe signals on a bus 34 and that are applied to a light emitting diode printbar 26. As will subsequently become clear, those strobe signals act as timing signals that synchronize light emissions from the light emitting diode printbar with the motion of the photoreceptor. Furthermore, the strobe signals control the exposure times of the light emitting diodes within a line print period. A line print period is the time in which a line of the composite image is available for illuminating a photoreceptor 32. A line print period is therefore analogous to a scan line period in a raster scanner. Of course, the line print periods must occur such that the composite of all of the various lines produces the desired image.

The strobe signals are produced from system information supplied to the printbar control electronics from the electronic subsystem. Once the interactions of the strobe signals with the multibit video information, described below, are understood, skilled workers in the applicable arts will be able to implement a multitude of different schemes for deriving strobe signals. However, an example of the considerations which go into developing the strobe signals may be useful. Consider the particular problem of exposing a photoreceptor such that the smallest gray level dot is produced. The proper exposure depends upon factors such as the photosensitivity of the photoreceptor, the settings of the subsequent developer, the relative motion between the light emitting diode printbar and the photoreceptor, and the ON time of the particular light emitting diode assisted with the dot. Furthermore, add in the complexity of allowing an operator to influence the minimum darkness level of the dot. Then, based upon the foregoing and other considerations, the problem for the electronic subsystem 18 is to produce a strobe signal such that the light emitting diode associated with the dot of interest is turn on for the proper amount of time when the multibit video information requires that a minimum size dot is to be produced. To determine the specific time period, the system information would include information about the charge on the photoreceptor, the settings of the developer, and the relative speed of the photoreceptor.

Significantly, the use of strobe signals is not only useful for compensating for variations in the system information, but the strobe signals can also be used to adjust the exposure position within a line print period. While the line print period represents the time period in which a line may be exposed, by selecting specific strobe signals, the actual imaged position within a line can be controlled. For example, consider a prior art printer a line print period of time t and having a photoreceptor moving past a light emitting diode printbar at a velocity v. Then, if a particular light emitting diode is illuminated for the full time t, a distance of t times v is exposed. However, by using multiple strobe signals, and by gating the light emitting diode printbar on for only half of the time t, a distance of t/2 times v is exposed. Furthermore, by varying the specific time duration within the time period t that the light emitting diode printbar is turned on the centroid of the dot which is produced can be shifted. This control of the exposure time and the control of the specific print period within the time period t is analogous to sub-scan line corrections in a raster output scanner.

The printbar control electronics 22 produces a bus control signal on a bus control line 41, a pixel clock on a pixel clock line 33, and reset signal on a reset/latch line 39. As shown in FIG. 1, all of those signals are applied to the light emitting diode printbar 26. Finally, the light emitting diode printbar applies temperature information on a temperature line 31 to the printbar control electronics. The temperature information assists in developing the strobe signals.

Figure 2:
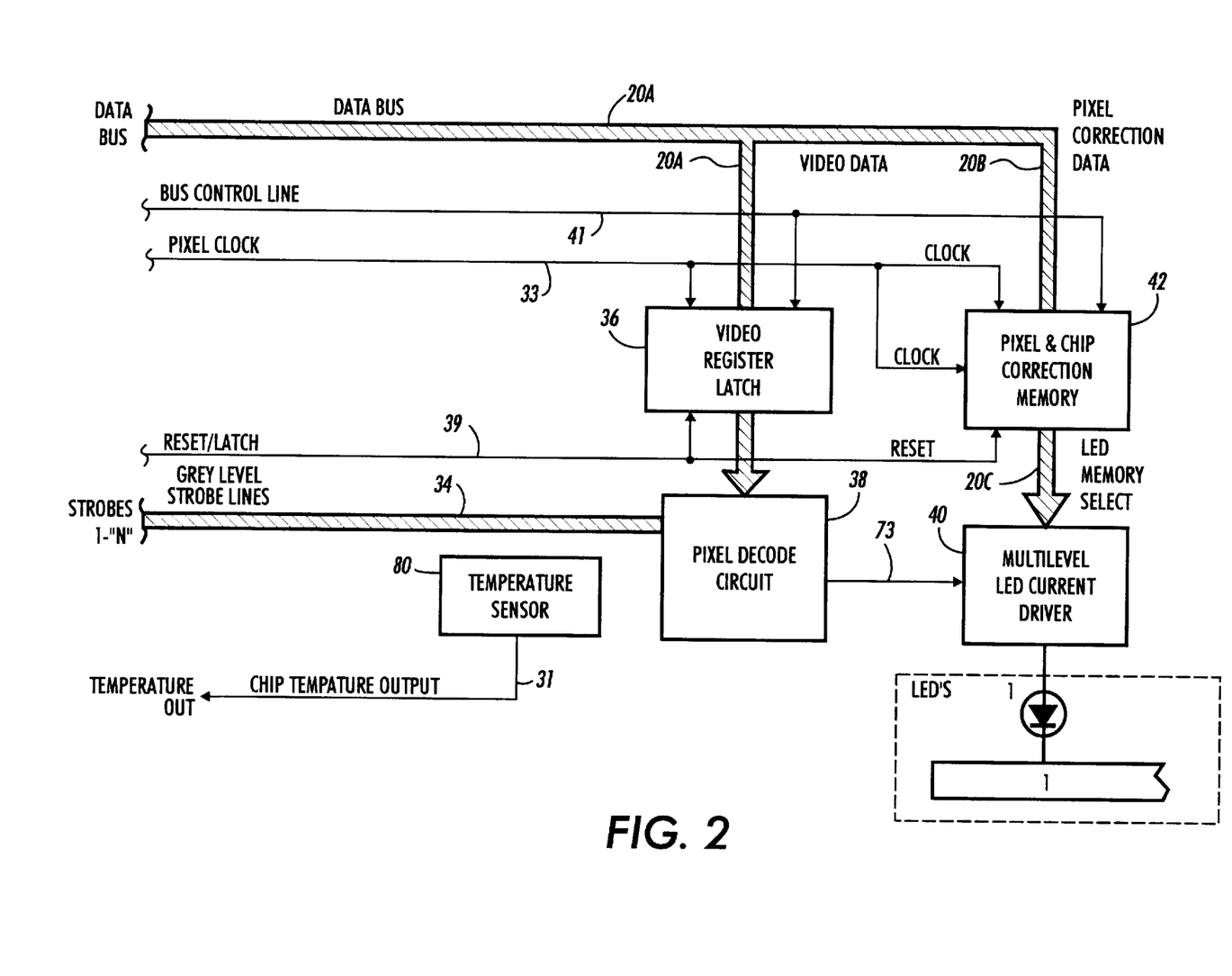
FIG. 2 presents a block diagram of the printbar control electronics and the light emitting diode printbar shown in FIG. 1.

Whatever the specific functions provided by the electronic subsystem and the printbar control electronics, the end result is a controlled activation of the individual light emitting diodes of a light emitting diode printbar 26 so as to produce modulated exposure-induced discharge patterns on the surface 32 of a charged photoreceptor 28. Referring now specifically to FIG. 2, the light emitting diodes are caused to turned on and off by information received from the printbar control electronics 22, which, in turn, responds to the video data from the electronic subsystem 18.

As previously mentioned, the video data signals from the electronic subsystem are sent to the printbar control circuit 22 along bus 20. In practice the bus 20 is beneficially a multiline data bus comprised of between say 8 and 32 lines, along with appropriate clock signals. Here it is assumed to be 16 lines wide. The video information pass through the printbar control circuit and is applied to the light emitting diode printbar on a bus 20A. That bus is used not only to load the multibit video data (the image bit map), but also pixel correction data (see below). The multibit video data is temporarily stored in a video register/latch 36 that is sufficiently large to store multiple bits for each light emitting diode in the light emitting diode printbar 26. The video register/latch acts as a line buffer, one line of data is stored while another line is being processed. The pixel correction data is stored in a Pixel & Chip Correction Memory circuit 42. The Pixel & Chip Correction Memory circuit 42 stores correction information that is used to compensate the light emitting diodes so that they all produce substantially the same illumination level.

Which of the two types of data is on the bus 20 is arbitrated by a bus control signal on the line 41. For example, when the data on the bus is pixel correction data the bus control signal might be HIGH, and when the data on the bus is video information the bus control signal might be LOW. To synchronize the flow of data from the printbar control electronics into either the Video Register/Latch 36 or into the Pixel & Chip Correction Memory circuit 42, the printbar control circuit 22 applies a reset/latch signal to the reset line 39. Depending upon the state of the signal on the bus control line 41, this resets either the Video Register/Latch 36 or the Pixel & Chip Correction Memory circuit to zero, and, if the Video Register/Latch is selected, transfers the video data from temporary storage locations to an output latch circuit. Then, data is applied to the bus 20 and, after a short delay, the state of the signal on the pixel clock line 33 is changed. The data on the bus 20 is then stored in the selected temporary memory location. Data is then continuously clocked into the subsequent memory locations until one full line of image information is available. Individual control gates within the chips signal adjacent storage positions when their memory locations are completely full. That is, until information is received for each light emitting diode of the light emitting diode printbar.

Considering now the processing of the multibit video data in the Video Register latch. The Video Register Latch contains one line of video information that is to be processed prior to applying it to the light emitting diodes. At the next reset/latch signal the information just received for a line of image data is internally transferred to a memory cell that has N bits of data, assumed to be 4, for each light emitting diode that is to be illuminated. Each of the N bits of data is applied to its own pixel decode circuit 38. That is, if there are 4096 light emitting diodes that comprise the print bar, there are 4096 pixel decode circuits. Additionally, the N strobe lines are applied to each pixel decode circuit.

Figure 3:
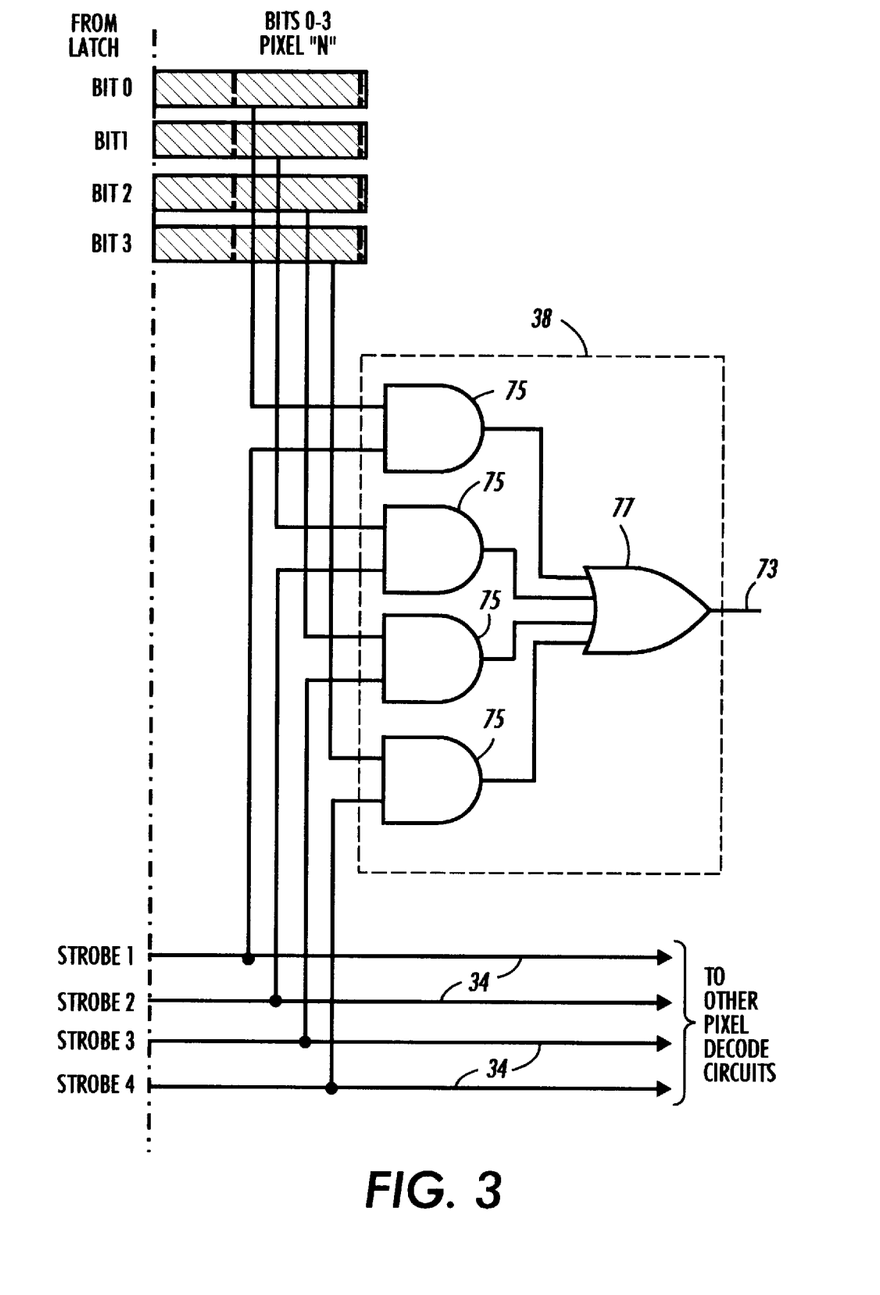
FIG. 3 schematically depicts the strobe signal decode logic used in the printbar control electronics of FIGS. 1 and 2.

FIG. 3 shows an exemplary pixel decode circuit 38. The 4 bits of data stored in the Video Register Latch are applied individually to separate dual input AND gates. The other input of each AND gate connect to one of the strobe lines. The outputs of the AND gates are applied to a logical OR gate 77. The output of an OR gate 77 is applied via a signal line 73 to an LED current driver 40. The pixel decode circuits implement the Boolean function: (bit 0)·(STROBE 1)+(bit 1)·(STROBE 2)+(bit 2)·(STROBE 3)+(bit 3)·(STROBE 4), where bits 0, 1, 2, and 3 are the individual bits of the multibit video information for a pixel, and strobes 1, 2, 3, and 4 are the logic values on the strobe lines. That LED current driver causes a predetermined one of the light emitting diodes of the light emitting diode printbar to be illuminated when the signal on line 73 is in a predetermined state (assumed hereinafter to be HIGH). If there are 4096 light emitting diodes there are also 4096 signal lines and 4096 LED current drivers. Significantly, the strobe lines are applied to all of the individual pixel decode circuits.

As previously indicated, the strobe line signals contain time related information regarding the required exposure choices. For example, the strobe line signals might represent the developed image profile of the printer, or it might represent the required relative spatial position of the pixel on the photoreceptor and the light emitting diode printbar. Interactions of the strobe line signals and the multibit video information that results from the pixel decode circuit 38 are beneficial in producing an enhanced final image. Two examples of beneficial strobe line signals -multibit video information interactions are presented below. In the following it is assumed that the multibit video information is 4 bit, digital weighted gray scale information, that is, it represent 16 equally spaced exposure levels (including zero exposure).

The first example of using the interactions between the strobe line signals and the multibit video information is to produce a final gray level image from the multibit video information. While the multibit video information represents linear exposure changes, the actual gray level dot produced in the final image will also depend upon other xerographic characteristics. While the relationship between light exposure and the final gray level dot might be complicated, one of the most important things to know is the minimum exposure level. That is, the exposure level that produces the lightest gray level dot, the one represented by multibit video information (0001). Therefore, it will now be assumed that the printbar control electronics processes signals on the bus 20 and the temperature information on signal line 31 so as determine the minimum exposure level. Special sensors and test sequences can be used as required to determine that minimum exposure level. That minimum exposure level is converted to a time duration, how long must a given light emitting diode be turned on to produce the minimum exposure.

Figure 4:
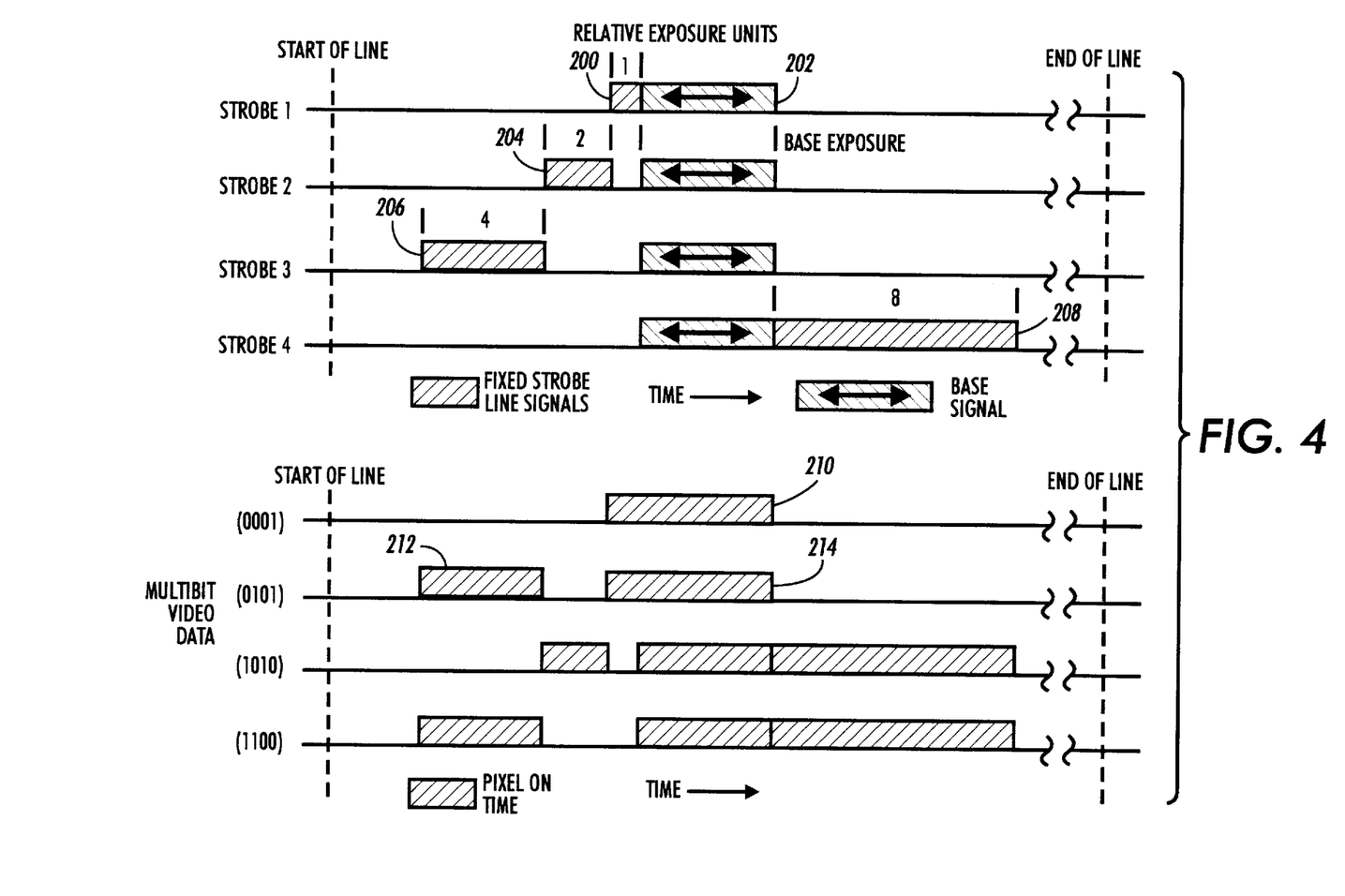
FIG. 4 illustrates exemplar exposure profiles when the strobe signals incorporate a variable base exposure level and the multibit video information takes the form of gray levels.

Turning now to FIG. 4, the minimum exposure time duration is divided into two components, a first signal 200 and a base signal 202, see the strobe line 1. The base signal represents an exposure time somewhat below that required to exposure a pixel that would be developed. As shown in FIG. 4 the base signal 202 is applied to each of the strobe lines at some point midway through the time in which a line of the image is being exposed. In practice, the tine duration of the base signal might change to represent the changing states of the printer. The first signal 200 has a time duration such that when combined with the base signal 202 a minimum duration dot is developed. Still referring to FIG. 4, strobe line 2 has a second signal 204 that has a time duration such that when it is combined with that of the base signal a dot somewhat darker than that of the minimum dot is produced. Furthermore, as shown in FIG. 4, while the base signal 202 on strobe lines 1 and 2 occur at the same time, the signals 200 and 204 do not overlap. Likewise a third signal 206 occurs on the third strobe line and a fourth signal 208 occurs on a fourth strobe line. As shown the duration of the third signal is longer that that of the second signal, but not as long as that of the fourth signal. Additionally, the first through fourth signals, referred to hereinafter collectively as the fixed strobe line signals, do not overlap. Finally, the time duration of the fixed strobe line signals produced by the electronic subsystem are such that the linear exposure changes result.

FIG. 4 also shows the light emitting diode ON times that result from various multibit video information combinations. If the multibit video information is (0001) the light emitting diode is ON for the time 210, the minimum exposure results. If the multibit video information is (0101) the light emitting diode is ON for the time 212, which corresponds to that of the third signal 206, and for the time 214, which corresponds to the minimum exposure time.

Figure 5:
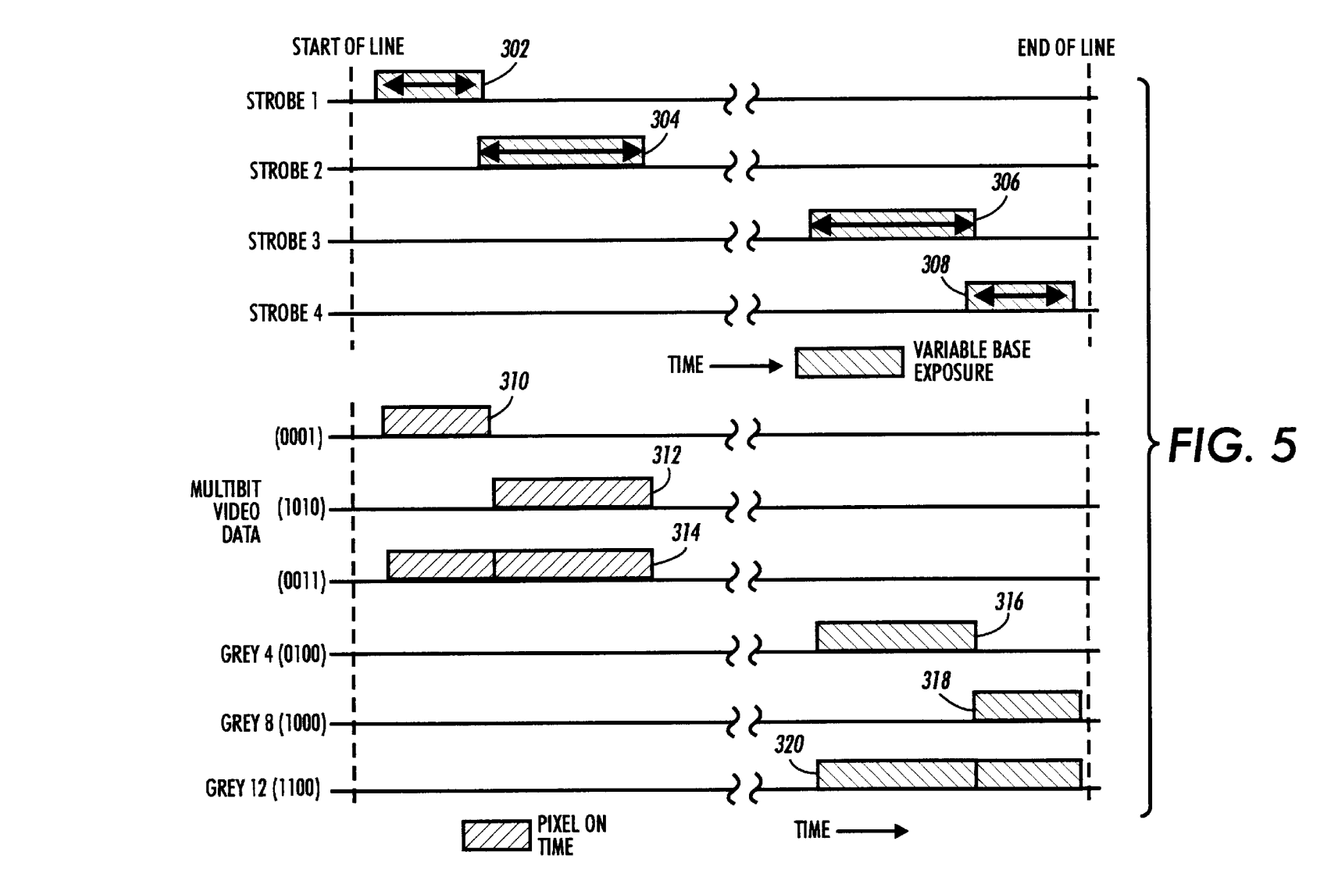
FIG. 5 illustrates exposure profiles when the strobe signals are used to produce position (time) shifted exposures.

A second example of using the interactions between the strobe line signals and the multibit video information is to produce a pixel time configuration that is position or time weighted such that the centroid of a pixel is shifted in the process direction. It is to be understood that the electronic subsystem processes its information so as to develop video data signals having a spatial weighting relationship that defines a spatial shift in the centroid of a gray level spot that is to be produced. FIG. 5 shows strobe line signals that occur at various times within the exposure time of a line of the image. As shown, each strobe line is enabled for non-overlapping periods of the time in which an image line is written. Strobe line 1 is enabled for a time period 302, strobe line 2 is enabled for a time period 304, strobe line 3 is enabled for a time period 306, and strobe line 4 is enabled for a time period 308.

The techniques described above are preferably implemented in a system in which all of the light emitting diode of a light emitting diode printbar output the same light intensity when they are turned on. However, as is well known, light emitting diodes, even ones fabricated on the same substrate, do not have uniform input drive current verses light output responses. That response is frequently referred to as electrical to optical gain efficiency. Without compensation, variations in the electrical to optical gain efficiency of the individual light emitting diodes result in non-uniform pixel intensities. The print engine data flow architecture 8 provides for compensation of the variations in electrical to optical gain efficiency.

It is to be understood that during manufacture of the machine which uses the print engine data flow architecture 8 that the particular "gain" of each pixel is measured and stored as correction values in the printbar control electronics 22. Preferably the correction for each pixel is comprised of two parts, a first part represents a correction for the particular substrate that the light emitting diode is fabricated on, the second part represents a specific correction factor for the particular light emitting diode. The first part may be referred to as a chip correction while the second part might be referred to as an individual pixel correction. Separating the correction values for each light emitting diode into two parts is beneficial since most light emitting diodes on a given substrate have fairly close electrical to optical gain efficiencies. Therefore, the first part will bring the light emissions from each substrate near the correct value, while the second part will bring the light emission from each light emitting diode a the substrate to the proper level. In practice, 4 bits might be used to compensate for the substrate variations and 4 bits might be used to compensate for variations within the substrate. Therefor, the magnitude of the ON current applied to each LED might be controlled by a total of 8 bits of correction. Each pixel uniformity correction value is dedicated to one LED driver output, but the chip uniformity correction is dedicated to the entire LED chip, which may contain 64 or more individual pixels.

Turning now to FIG. 2, at a suitable time, usually at machine power up, the stored correction values (which might have been altered for temperature, aging or other factors) are downloaded into the Pixel and Chip correction memory 42. Those values are stored and are used to set the drive current for the individual light emitting diodes such that each light emitting diode outputs the same amount of light when turned ON.

The loading of the stored correction values into the Pixel and Chip correction memory is described above. However, the stored correction values need only be loaded once.

While the embodiment disclosed herein is preferred, it will be appreciated from this teaching that various alternative, modifications, variations or improvements therein may be made by those skilled in the art, which are intended to be encompassed by the following claims.

I claim:

1. A digital printer, comprising:

a charged recording medium;

a printbar having a plurality of individual light emitting diodes aligned in an image exposure relationship with said charged recording medium;

a communication bus for conveying a multibit video data representation of an image line comprised of a plurality of pixels, wherein each pixel is represented by multiple data signals, said communication bus further for conveying printer information related to an operating condition of the digital printer;

a strobe line bus;

a data bus;

an electronic subsystem for applying said multibit video data representation and said printer information to said communication bus;

a printbar controller receiving said multibit video data representation and said printer information, said printbar controller for producing multiple strobe line signals from said printer information and for applying said multiple strobe line signals to said strobe line bus, said printbar controller further for applying said multibit video representation to said data bus;

a video register latch receiving said multibit video data representation on said data bus, said video register latch for temporarily storing said multiple data signals that represent a selected pixel;

a pixel decode network operatively connected to said video register latch and to said strobe line bus, said video register latch for logically ANDing each signal of said stored multiple data signals with an individual one of said strobe line signals, said pixel decode network further for logically ORing the results of said ANDing, thereby producing a binary drive signal; and a current driver for driving current into a selected light emitting diode when said drive signal is in a predetermined state so as to expose said selected pixel.

2. The digital printer of claim 1, further including a Pixel correction memory for storing a predetermined pixel exposure correction for said selected light emitting diode, wherein said current driver uses said predetermined pixel exposure correction to set said drive current to said selected light emitting diode such that said selected light emitting diode emits light at a predetermined intensity.

3. The printer of claim 1, wherein said printer information includes information related to an exposure threshold of said charged recording medium and wherein said printbar controller produces said strobe line signals so as to compensate for the exposure threshold.

4. The printer according to claim 1, wherein said charged recording medium and said printbar move relative to one another.

5. The printer according to claim 4, wherein said printer information includes information related to said relative position of said printbar and said charged recording medium, and wherein said printbar controller produces said strobe line signals such that a logical combination of said strobe line signals and said multiple data signals adjusts the position of said selected pixel on said recording medium.

6. The printer according to claim 1 wherein the duration of each strobe line signal is at least as long as a minimum exposure period required to image a pixel on said charged recording medium.

7. An image recording apparatus comprising:
a moving recording medium;
a printbar having a plurality of light emitting diodes aligned along at least one row, said printbar positioned in an image exposure relationship with said moving recording medium;
a source of digital video data signals representing a line of an image comprised of a plurality of pixels, and wherein each pixel is represented by multiple data signals;
a source of strobe input signals that relate to an operating state of the image recording apparatus;
an LED driver for selectively applying a drive current to a light emitting diode of said plurality of light emitting diodes for a period of time determined by a drive signal; and
a printbar controller for producing said drive signal by decoding said strobe input signals in conjunction with said multiple data signals, said printbar controller including:
a video register latch for temporarily storing multiple data signals for a selected pixel; and
a pixel decode network for logically ANDing each signal of said stored multiple data signals with an individual one of said strobe line signals, said pixel decode network further for logically ORing the results of said ANDing to produce said drive signal.

8. The apparatus of claim 7, wherein said LED driver includes a LED uniformity correction circuit for adjusting said drive current such that said light emitting diode emits light at a predetermined intensity.

9. The apparatus of claim 7, wherein said printbar controller produces said drive signal such that said drive signal adjusts the exposure of said moving recording medium.

10. The apparatus according to claim 7, wherein a logical combination of said strobe line signals and said multiple data signals adjust the position of said pixel on said moving recording medium.

11. The apparatus according to claim 7 wherein the duration of each strobe line signal is at least as long as a minimum exposure period required to image a pixel on said moving recording medium.

* * * * *